United States Patent [19]
Schwarzler et al.

[11] 3,804,997
[45] Apr. 16, 1974

[54] CONTACT SYSTEM FOR HIGH-SPEED ELECTRICALLY OPERATED VEHICLES

[75] Inventors: Peter Schwarzler, Furstenfeldbruck; Gunter Winkle, Munich; Peter Molzer, Hebertshausen, all of Germany

[73] Assignee: Krauss-Maffei Aktiengellschaft, Munich, Germany

[22] Filed: Sept. 27, 1972

[21] Appl. No.: 292,638

[30] Foreign Application Priority Data
Sept. 30, 1971 Germany.......................... 2148943

[52] U.S. Cl................ 191/48, 191/59.1, 104/23 FS
[51] Int. Cl............................................... B60l 5/40
[58] Field of Search............ 191/45, 47, 48, 49, 50, 191/57, 59, 59.1, 66; 104/23 FS, 148 LM, 148 MS, 148 SS

[56] References Cited
UNITED STATES PATENTS
| 2,537,866 | 1/1951 | Tanner.................................. 191/57 |
| 3,233,559 | 2/1966 | Smith............................. 104/23 FS |
| 3,664,268 | 5/1972 | Lucas............................ 104/148 SS |

Primary Examiner—Robert G. Sheridan
Assistant Examiner—D. W. Keen
Attorney, Agent, or Firm—Karl F. Ross; Herbert Dubno

[57] ABSTRACT

The contact shoe or shoes of an electrically operated high-speed vehicle, traveling along a track provided with contact rails engageable by these shoes for the delivery of electric current to the vehicle, is guided by applying a contactless force field between guide portions of the contact rail assembly and support portions of the brush assembly. The force field is preferably derived from a magnetic field or an air cushion.

13 Claims, 11 Drawing Figures

3,804,997

CONTACT SYSTEM FOR HIGH-SPEED ELECTRICALLY OPERATED VEHICLES

1. Field of the Invention

The present invention relates to contact systems for electrically operated vehicles, and more particularly, to improvements in systems for guiding the contact-shoe structures of high-speed electrically operated vehicles.

2. Background of the Invention

Elevated and subterranean electrical vehicle systems, e.g. surface railroads and subways, have been provided heretofore with electrical drive means and/or electrical controls which are operated, at least in part, by electrical energy communicated to the vehicle by means of contact rails flanking the support rails of the vehicle. These contact or "third" rails conduct electricity to the vehicle by means of brushes, wipers or shoes on the latter which slidingly or rollingly engage contact surfaces of these rails.

For vehicles operating at the relatively low speeds of such conventional railroads, these contact-shoe systems have proved to be satisfactory in most instances. In recent years, however, there has been a growing demand for more rapid transit systems, i.e. high-speed transportation vehicles for interurban transit, intraurban transit and transportation between urban centers and suburban or rural locations. In a system for increasing the speed of electrically operated vehicles, the friction between the support or track and the vehicle is reduced by providing a force field to support the vehicle upon the track. Such vehicles are generally magnetic-suspension vehicles or air-cushion-suspension vehicles.

In vehicles of the first type, the support or track may be provided with a ferrous-metal support rail while the vehicle is provided with an electromagnet whose induction path is closed through the ferrous-metal rail. The resulting magnetic force in the gap suspends the vehicle from the support. In air-cushion vehicles, air is forced at high velocity into a gap between confronting surfaces of the support and the vehicle so that the vehicle in effect floats upon the cushion of air.

By thus reducing the friction between the vehicle and the support, especially high speeds can be obtained. However, with increasing vehicle speeds there are increasing problems with respect to communicating electric energy to the vehicle. At low speeds, for example, the contact shoe remains in sliding engagement with a contact rail without significant difficulty. However, at higher speeds, flutter or other instability of contact develops. Furthermore, the noise produced at the contact assembly and the wear of the contact rails and shoes increase at a faster rate with increasing speed than is desirable. For the most part guiding the contact assembly of a high-speed vehicle is considered a problem for these reasons.

3. Objects of the Invention

The principal object of the present invention is to provide an improved system for guiding the contact system of an electrically operated vehicle with respect to the current carrying rail or rails of a high-speed vehicle system.

Another object of the invention is to provide a low-friction contact system for electrically operated vehicles which will obviate the aforementioned disadvantages.

4. Summary of the Invention

These objects and others which will become apparent hereinafter are attained, in accordance with the present invention which provides an improved system for guiding the contact-shoe arrangement of a high-speed electrically-operated vehicle, with reduced noise and wear, the system comprising means for applying a contactless force field for the shoe arrangement, e.g. of the magnetic or air-cushion type. In other words, the guide elements and the rail are positioned by contactless means via a force-transmitting medium, namely, the air cushion or magnetic field, to maintain the guide element and the rail or a surface fixed relatively thereto in a predetermined spacing. The contactless means according to the invention preferably allows some degree of freedom of movement in a direction parallel to the gap and provides a system for increasing or decreasing the guide force in accordance with incipient changes in the gap dimension. The contact-free relative mobility of the guided element and the guide rail is thus without wear of either of the parts. In the case of a magnetic field, the latter can be generated by the passage of an electric current through a magnetic coil, the current being adjusted to compensate any variations in the gap dimensions. In the case of the air cushion, the compensation may be automatic as described hereinafter.

According to the invention, moreover, the guide means is effective in two mutually perpendicular planes whereby the guide rail or rails may have two mutually perpendicular guide surfaces and the guide element may have air-cushion or magnetic means respectively juxtaposed with these surfaces. In this way it is possible not only to restrict the lateral movement of the shoe assembly but also to control the pressure of the shoes upon the rails. Both force fields can, of course, be adjusted to maintain constancy of operation.

According to yet another feature of the invention, the contact or current-carrying rail simultaneously serves as the guide rail, i.e. is provided with a surface in addition to the contact surface, which is juxtaposed with the guide element, e.g. an electromagnetic or air-cushion chamber. Preferably the current-carrying rail is shaped as a hollow profile and may be composed of a nonmagnetic material having low electrical losses, e.g. copper or aluminum. When the force field is magnetic it has been found to be advantageous to introduce within the hollow profile ferromagnetic (e.g. iron) inserts in the form of strips or bands, which are affected by the magnetic field through the permeable but nonmagnetizable wall of the current-carrying rail.

To equalize or compensate the different coefficients of thermal expansion of the iron inserts and the aluminum or copper rails, it has been found to be desirable to provide elastic elements between them. Thus the iron elements can be held within the hollow profiles by springs or like elastic members.

When the current-carrying rail is constituted as well as the guide rail, it should be provided with corresponding guide surfaces as previously indicated. These guide surfaces may lie at an angle to the shoe-engaging contact surface and can be formed as flanges, ribs or ridges in the wall of the current-carrying rail.

The system of the present invention has several advantages. For example, when air cushions are employed, the energy expended in producing the air cushion and for guiding the shoe assembly is relatively small by comparison to the saving and wear of the assembly. With magnetic guide systems, similar savings may be obtained, but, in addition, the noise produced by the guidance system is minimal. The magnetic field may be either of the tractive or of the thrust type, i.e. the electromagnetic means may be constructed as to attract or repel the armature formed by the guide rail. In either case, it is preferred to provide two oppositely effective magnets, both of which are of the tractive or both of which are of the thrust type. When the air cushion generator, always of the thrust type, is employed, it is also desirable to balance the force generated thereby by a counteracting force from another air cushion or magnetic device.

In view of the fact that the force components applied in each gap are preferably balanced by a force component in the opposite direction applied at another gap, the guidance system, e.g. an air-cushion or magnetic-field generator, may embrace or extend around a flange of the guide rail. In this case, it has been found to be desirable to mount the force-field generator upon a pivotal member which may be swung away to permit the guidance assembly to be withdrawn.

5. Description of the Drawing

The above and other objects, features and advantages of the present invention will become more readily apparent from the following description, reference being made to the accompanying drawing in which.

6. Specific Description

Figure 1:
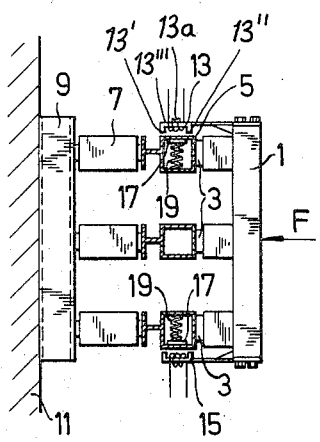
FIG. 1 is a vertical cross-section of a thru-phase contact assembly according to the invention, showing the rails and a contact-shoe arrangement juxtaposed therewith.
Figure 9:
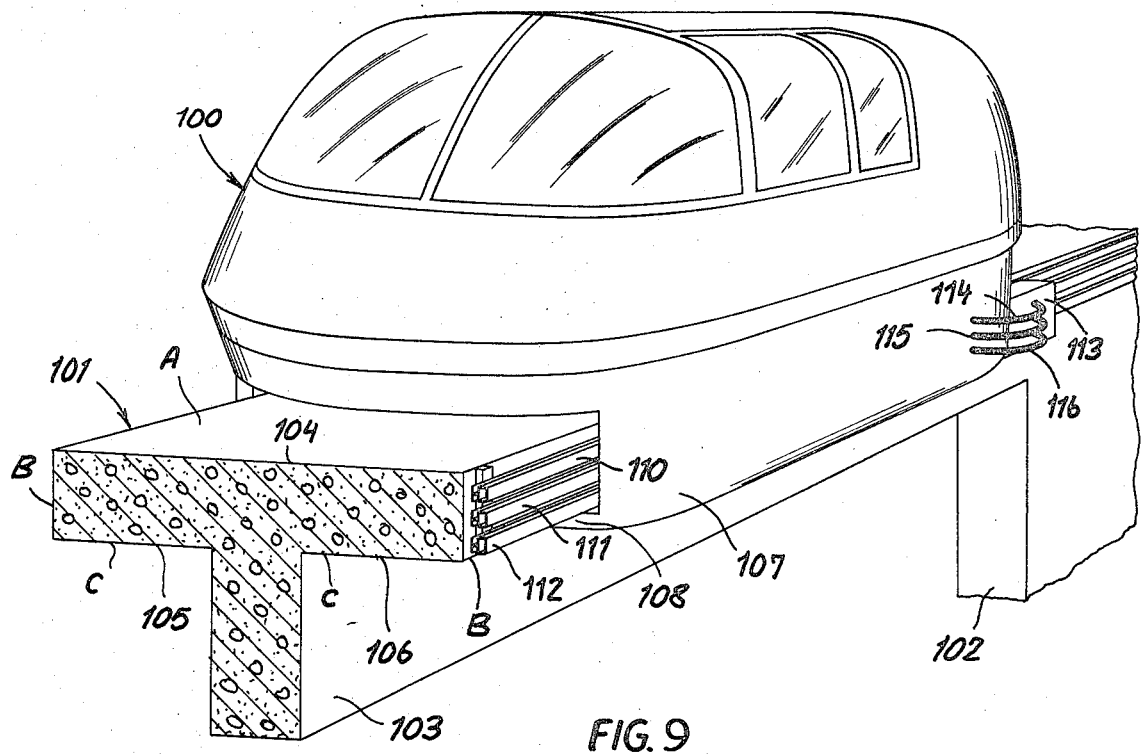
FIG. 9 is a diagrammatic perspective view of a vehicle system embodying the invention.

Referring first to FIG. 9, it may be seen that the present system is applicable to a high speed magnetically-suspended or air-cushion vehicle 100 negotiating a track 101 which is represented as an elevated T-section member in FIG. 1, supported at intervals by posts or pylons 102.

The track 101 comprises a web 103 of concrete which is formed monolithically with the crossbar 104 of the T, the crossbar comprising a pair of lateral flanges 105 and 106.

The vehicle 100 is provided along its sides with aprons 107 which carry flanges 108 turned inwardly to underhang the flanges 105 and 106 of the track. By providing an air cushion between the surfaces A, B and C of the track and the juxtaposed surfaces of the vehicle, it is possible to maintain the latter in a substantially frictionless state independent of the loading of the vehicle, the air cushions being self-adjusting with increased loading to maintain a predetermined gap width. Similarly the surfaces C of the flanges 105 and 106 and, preferably, the lateral surfaces B may be provided with rails of a ferromagnetic material which are juxtaposed with electromagnets to constitute armatures thereof. When these electromagnets are energized, the vehicle is said to be magnetically suspended. The electromagnet current may be increased or decreased to maintain a constant suspension gap. Any conventional drive force, generally derived from an electric motor, may be used. Since these elements are not essential to the present invention, they have been neither described nor illustrated in detail.

The present invention, however, deals with the delivery of electric current to the vehicle, e.g. to drive the blowers of an air cushion suspension, to energize the electromagnets and/or to operate the motive-power source which may be an electric motor. To this end, a plurality of current-carrying contact rails are provided along the web 103 or along the flank B of flange C as shown at 110, 111, 112. These rails may be energized by the respective phases of a three-phased source. When single-phase or direct-current energization is employed, two rails will suffice. The vehicle 100 also carries within the apron, below the apron, or externally thereof, a contact-shoe assembly diagrammatically represented at 113 and provided with contact shoes engaging each of the rails and connected by electric lines 114, 115 and 116 to the electrical system of the vehicle. Means may be provided to urge the assembly 113 against the rails 110 – 112 when guide systems only are provided as is the case in the systems of FIGS. 1 and 2. In the more general case, however, the assembly 113 will also include means for applying the contact shoes against the rails.

In FIG. 1, there has been illustrated an arrangement in which the current-collector arrangement 1, analogous to the shoe assembly 113 previously described, is movably mounted upon the vehicle and carries three shoes, brushes or wipers 3 which are urged under a constant force F in the direction of the arrow against the current-carrying rail 5.

The current-carrying rails 5 are mounted via insulators 7 on iron profiles 9 which, in turn, are carried by the track 11, the latter being analogous to the track 101 previously described.

In addition, the current-takeup device 1 comprises an upper electromagnet 13 and a lower electromagnet 15 which are oppositely effective and flank the array of rails. The electromagnets are of channel or U-cross-section with poles such as are shown at 13' and 13" juxtaposed with the upper and lower lateral flanks of the rails, and a web 13''' about which an electromagnetic coil 13a is wound. The poles 13' and 13" are spacedly spanned by an iron or steel strip 17 contained within the hollow profile rail 5 and held by springs 19 against the inner faces of the rail flanks which are juxtaposed with the electromagnets. Similar magnetically attractable iron of steel strips are provided for the electromagnet 15.

The iron or steel strips function as armatures which are attracted toward the electromagnets 13 and 15 so that the current-takeup device 1 is accurately positioned with respect to the rails.

Figure 10:
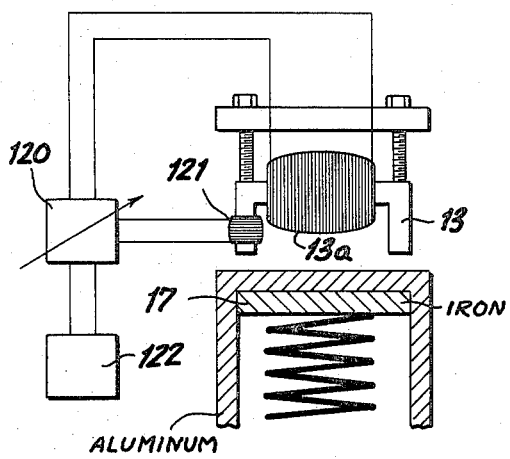
FIGS. 10 and 11 are diagrammatic cross-sectional views illustrating possible control systems for the force-generating device.

As illustrated in FIG. 10 each electromagnet 13 or 15 may be energized through a controller 120 with a variable-amplitude current determined by a feedback signal derived from a pickup coil 121 from a source 122. Member 120 may be a saturable-core reactor. As the electromagnet 13 approaches the iron strip 17 (gap reduction), the magnetic flux traversing the pickup coil increases and the current delivered to the electromagnet coil 13a is reduced. Conversely, as the gap tends to increase, the flux diminishes and the electrocurrent to the coil 13a is augmented. In this manner, the current-pickup device is guided without contact with the guiding surfaces and is magnetically suspended. The spacing is also maintained constant by control of the energizing current. The attractive electromagnets 13 and 15 are oppositely effective and may balance one another.

Figure 2:
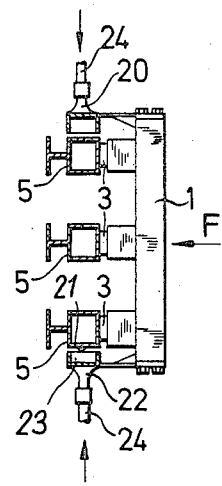
FIG. 2 is a view of a system similar to FIG. 1 wherein, however, air-cushion devices are employed.

In FIG. 2, there has been illustrated an embodiment of the invention in which, instead of magnetic field forces for the contactless guidance of the current-takeup device 1, air cushions are provided to constitute the force field. In this embodiment as in all embodiments in which air cushions are used, they may derive from a nozzle 20 or 22, connected to an air-pressure source via the pipe 24, the nozzle having a box-like chamber 23 juxtaposed with a flat and substantially coextensive surface 21 of a rail flank.

Figure 11:
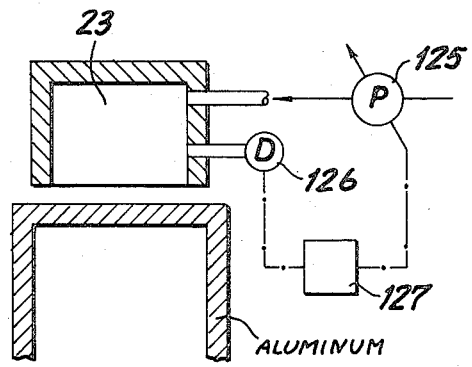

When air is forced under pressure through the nozzles and a limited clearance is provided between the nozzles and the juxtaposed guide-rail flank, the air cushion formed between the nozzle and the guide rails maintains the gap. To control the air pressure, the device illustrated in FIG. 11 may be used although an air-cushion is usually self-regulating as noted below. From this Figure it will be apparent that the source 125 of air pressure may be of the variable type. A pressure sensor 126 is here connected to the chamber 23 and detects pressure drops indicating a potential decrease in the gap to increase the pressure at element 125 via a controller 127 of conventional construction. The detector is also effective to reduce the pressure should the air cushion have an excessive pressure tending to urge the guided and guiding elements apart.

As already noted, the guidance system of FIG. 2 comprises a flat air-cushion generator 20 in place of the electromagnet 13 and in juxtaposition with an upwardly turned guide surface, as well as a flat air distributor 22 juxtaposed with the downwardly turned surface of the guide rails and positioned analogously to the electromagnet 15. Even apart from the sensor 126, the air cushions are self-stabilizing so that the control device of FIG. 11 may be eliminated because, when the gap between the guided and guiding elements tends to increase, the pressure drops to reduce the gap and *vice versa*. As in the case of FIG. 1, the upper force-field generator must be of sufficient power to carry the load of the current-pickup device and the oppositely effective force of the lower force field generator. Since the guidance is contactless and automatically adjusted, sharp deflection of the current-takeup member are avoided. Ducts 24 are of the flexible type to accomodate some movement of the body 1.

Figure 3:
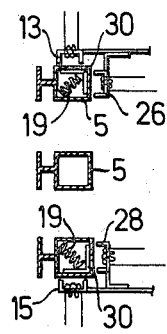
FIG. 3 is a view of a three-phase contact-rail-arrangement in which the guide system is effective in two orthogonal planes.

In FIG. 3, there has been illustrated an embodiment of the invention in which the current-takeup is guided in two mutually orthogonal (perpendicular) planes. Thus in the system of FIG. 3, viewed as applied to the vehicle arrangement of FIG. 9, the current-takeup body is electromagnetically positioned in a vertical plane parallel to the direction of vehicle movement and a horizontal plane parallel to the direction of the vehicle movement by the device of FIG. 3.

Figure 4:
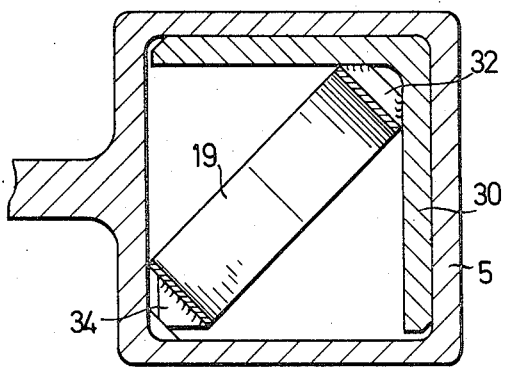
FIG. 4 is an enlarged cross-sectional view through a contact rail according to the invention.

In this embodiment, in addition to the upper and lower electromagnets 13 and 15, two lateral electromagnets 26 and 28 are juxtaposed with additional electromagnetic strips within the current-carrying tails 5. As has been shown in FIG. 4, the flat iron or steel strip of FIG. 1 may be replaced by an angle member 30 having two magnetically attractable legs respectively juxtaposed with the electromagnets 13 and 26 of the upper portion of the device or with electromagnets 15 and 28 of the lower portion thereof. The electromagnets 28 may be of the attractive type to maintain a constant pressure of the shoes 3 (not illustrated in FIG. 3) against the current-carrying rails. Alternatively, they may be of the repulsion type to resist displacement of the body 1 in the direction of the rails by some external force. The angle iron 30 of FIGS. 3 and 4 may be fitted into the hollow profile current-carrying rails 5 and are held in place therein by spring elements 19. The latter may be blade or leaf springs which are affixed on one side to adapter pieces 32 which fit into the corner of the angle iron and are of prismatic configuration. On the opposite sides of the spring elements 19, there are provided sliding members 34, likewise fitting into a corner of the hollow profile and reducing friction between the rail 5 and the spring. Other types of springs may, of course, also be used. The angle irons 30 may be inserted into the rails 5 in any desirable length and can be spaced apart slightly to accommodate expansion and contraction and/or may be separated by spring-loading spacers not further illustrated. It will be apparent that this arrangement automatically allows independent expansion and contraction of the rails and the magnetic armatures. The two-plane guidance of the current-takeup body limits sharp movements of the latter and also resists, without friction, rolling and yaw movements.

Each of the electromagnets of the system of FIG. 3 can be provided with a control device of the type illustrated in FIG. 10 to regulate the shoe pressure and maintain a constant spacing so that a substantially uniform current transfer between the rails and the shoes is effected.

Figure 5:
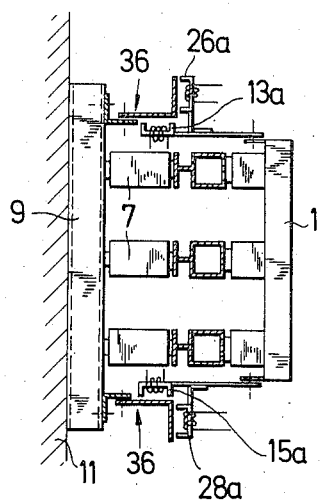
FIG. 5 is a view similar to FIG. 3 but illustrating another arrangement of the guide electromagnets.
Figure 6:
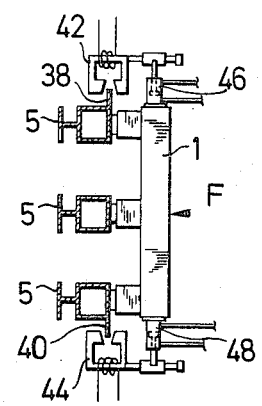
FIG. 6 is a view similar to FIG. 3 illustrating another embodiment using electromagnets.

FIG. 5 shows another embodiment of the present invention in which the current-takeup body 1 is guided in two mutually orthogonal planes. In this embodiment, a pair of angle-iron guide rails 36 are secured to the supports 9, flanking the current-carrying rail assembly. Juxtaposed with each leg of the guide rails is an electromagnet 13a and 15a, permitting movement in a horizontal plane but respective displacement in the vertical plane, and an electromagnet 26a or 28a limiting movement in the horizontal direction transverse to the direction of vertical movement. The angle-iron guide rails 36 are bolted together and secured by bolts to the support 9. However profile shapes may, of course, also been used. The upper magnet 13a thus takes up the weight of the current-takeup device 1 and also the attractive force of the electromagnet 15a. The electromagnet 15a may be used, therefore, simply to provide a weight equilibrium in the vertical direction. Any of the magnets shown in FIG. 5 may be provided with a control circuit as described in connection with FIG. 10. The embodiment of FIG. 6 uses only two electromagnets 42 and 44 with inwardly turned pole pieces which have pole faces converging away from armatures 38 and 40 formed on the rails 5 and constituted as webs projecting therefrom. The webs 38 and 40 are received between the pole faces and the system is self-stabilizing as with the air cushions previously described. In other words, as the web 38 or 40 tends to be withdrawn from the gap between the poles, the magnetic force increases and thereby tends to restore the original gap spacing. A regulation of the energizing current with these electromagnets is not necessary. It has been found to be advantageous, however, to mount the electromagnets 42 and 44 upon the current-takeup device 1 via hydraulic cylinders for spreading the magnets apart when it is desired to remove the assembly from the current-carrying rails. In the normal positions, illustrated in FIG. 6, the electromagnets are locked in place.

Figure 7:
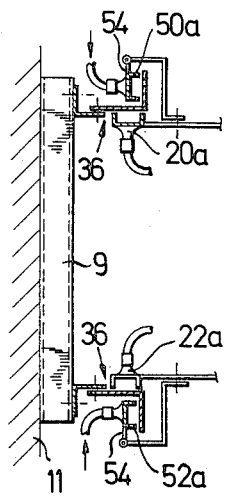
FIG. 7 is a cross-sectional view showing how an air-cushion arrangement can be effective in two orthogonal planes.

FIG. 7 shows a system whereby air cushions are used for guiding the current-takeup device in two orthogonal planes, the system being analogous to that of FIG. 5. Since the air cushions always operate in a thrust direction, the upper and lower air-cushion nozzles 20a and 22a are directed respectively upwardly and downwardly against the horizontal legs of angle irons 36 bolted to the support 9. The upper and lower air-cushion nozzles 50a and 52a, moreover, are directed against the vertical legs of the angle irons 36, i.e. the face of each angle iron turned away from the contact shoes. Again flexible hoses connect each nozzle with a source of air under pressure. The air cushions developed at nozzles 50a and 52a supply the pressure with which the contact shoes engage the rails (not shown). To enable removal of the assembly, the nozzles 50a and 52a are mounted upon pivotal members 54, i.e. are hinged, to permit the nozzles to be swing out of the way.

Figure 8:
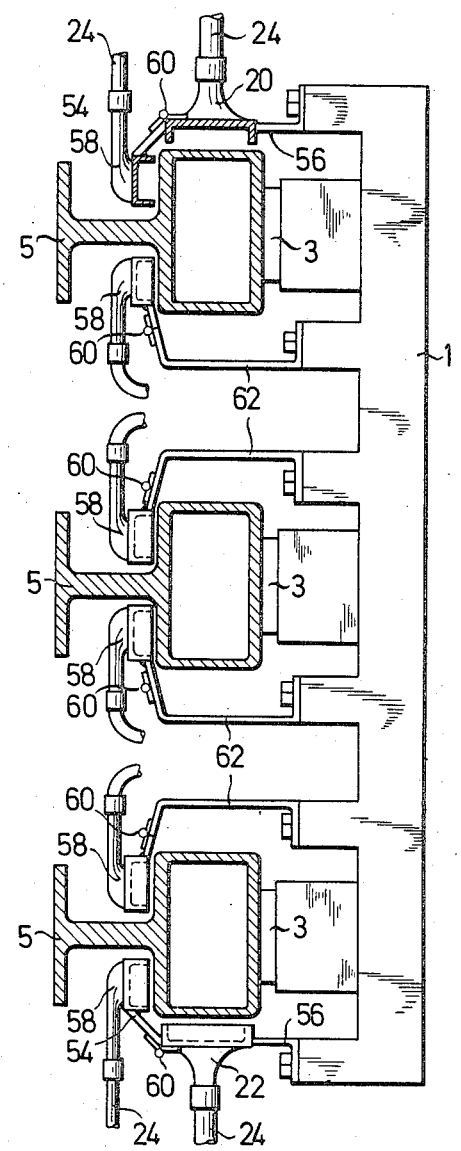
FIG. 8 is an enlarged cross-sectional view showing the modification of the system of FIG. 7.

FIG. 8 shows a system, according to the present invention, in somewhat greater detail. In this embodiment the rails 5 are shown to be of T-cross-section and may be composed of aluminum, having stainless steel contact springs along those faces engaged by the brushes or shoes 3. Each shoe is flanked by a pair of pedestals to which the nozzle assemblies are bolted.

The bolts 5 are shown to have hollow heads of rectangular cross-section with an internal cavity whose cross-section area makes up the major part of the overall cross-section of the rail and can contain a heat-conductive fluid such as water or liquid sodium. The rails may also be filled with heat-conducting solids such as solid metallic sodium.

The nozzle assemblies include a pair of nozzles 58 flanking the single-leg pedestals of each rail and directed toward the underside of the head of each roll while being connected with flexible tubes to a source of fluid under pressure. The air cushions developed behind each head of the rail provide the pressure with which the contacts engage the current-carrying rails.

The shoes 3 may, moreover, be spring-loaded with respect to the support 1 or can be hydraulically biased in the direction of the rails. Hinges 60 enable the nozzles 58 to be swung out of the way for removal of the assembly from the rails.

In addition, the assembly includes a pair of nozzles 20 and 22 confronting the upper surface and lower surface of the upper and lower rails, respectively, and secured by L-shaped brackets 56 to respective pedestals of the support wall. Flexible hoses 24 are also provided here to connect the nozzles to a source of fluid under pressure. To avoid tilting movement of the assembly 1, etc., about a vertical axis, it has been found to be advantageous to provide additional sets of nozzles corresponding to the nozzles 20, 22 and 58 in a further plane parallel to the plane of the drawing, i.e. to distribute the nozzles over planes perpendicular to the plane of the drawing. With the system of FIG. 8, moreover, some mobility (2° of freedom) of the current-takeup assembly with respect to the vehicle should be provided, i.e. the assembly 1 should be coupled to the vehicle flexibly with movement permitted in the vertical and horizontal planes parallel to the direction of travel.

We claim:

1. A contact system for a high-speed electrically operated vehicle comprising a track, at least one current-carrying rail extending along said tract; means forming a guide surface extending along said rail; a current-takeup device engaging said rail, and means on said vehicle adjacent said device juxtaposed with said surface for the contactless generation of a force field between said surface and said current-takeup device for guiding the latter along said rail.

2. The system defined in claim 1 wherein the last-mentioned means includes an electromagnet on said device and said force field is a magnetic field.

3. The system defined in claim 1 wherein the last-mentioned means is an air-cushion nozzle confronting said surface and said force field is an air cushion between said surface and said device.

4. The system defined in claim 1 wherein the last-mentioned means includes a pair of force-field generators oriented at right angles to one another and said surface has two portions lying in orthogonal planes each juxtaposed with a respective one of said generators whereby force fields are generated in two orthogonal planes.

5. The system defined in claim 1 wherein said surface is formed directly on said rail.

6. The system defined in claim 1 wherein the last-mentioned means includes a member reaching behind said rail, further comprising means for shifting said member to free said device from said rail.

7. A contact system for a high-speed electrically operated vehicle comprising a track, at least one current-carrying rail extending along said track and provided with a guide surface a current-takeup device engaging said rail; means juxtaposed with said surface for the contactless generation of a force field between said surface and said current-takeup device for guiding the latter along said rail, said rail being a hollow profile; and a magnetically attractable strip extending through said profile, the last-mentioned means including an electromagnet juxtaposed with said rail along said strip.

8. The system defined in claim 7 wherein said strip is an angle iron fitted into said rail and having legs at right angles to one another, the first-mentioned electromagnet being juxtaposed with said rail along one of said legs, said device being further provided with a second electromagnet juxtaposed with said rail along the other of said legs.

9. The system defined in claim 8, further comprising spring means fixing said angle iron within said rail.

10. A contact system for a high-speed electrically operated vehicle comprising a track, at least one current-carrying rail extending along said track and provided with a guide surface a current-takeup device engaging said rail; means juxtaposed with said surface for the contactless generation of a force field between said surface and said current-takeup device for guiding the latter along said rail, and a magnetically attractable web projecting from said rail the last-mentioned means including an electromagnet fixed to said device and having a pair of poles flanking said web.

11. A contact system for a high-speed electrically operated vehicle comprising a track, at least one current-carrying rail extending along said track; means forming a guide surface extending along said rail; a current-takeup device engaging said rail, and means juxtaposed with said surface for the contactless generation of a force field between said surface and said current-takeup device for guiding the latter along said rail.

12. The system defined in claim 11 wherein said force field is a repulsive magnetic field.

13. The system defined in claim 11 wherein said force field is an attractive magnetic field.

* * * * *